US012608524B1

(12) United States Patent
Barker

(10) Patent No.: US 12,608,524 B1
(45) Date of Patent: Apr. 21, 2026

(54) LOGIC VERIFICATION OF SUPERCONDUCTING ELECTRONIC CIRCUITS, INCLUDING FOR MARGIN ANALYSIS OF YIELD

(71) Applicant: Synopsys, Inc., Mountain View, CA (US)

(72) Inventor: Aaron John Barker, Broomfield, CO (US)

(73) Assignee: Synopsys, Inc., Sunnyvale, CA (US)

( * ) Notice: Subject to any disclaimer, the term of this patent is extended or adjusted under 35 U.S.C. 154(b) by 774 days.

(21) Appl. No.: 17/962,345

(22) Filed: Oct. 7, 2022

Related U.S. Application Data

(60) Provisional application No. 63/287,931, filed on Dec. 9, 2021.

(51) Int. Cl.
*G06F 30/33* (2020.01)
*G06N 10/20* (2022.01)
*G06F 119/22* (2020.01)

(52) U.S. Cl.
CPC ............. *G06F 30/33* (2020.01); *G06N 10/20* (2022.01); *G06F 2119/22* (2020.01)

(58) Field of Classification Search
USPC ......................................................... 716/106
See application file for complete search history.

(56) References Cited

U.S. PATENT DOCUMENTS

| | | | |
|---|---|---|---|
| 2021/0049482 A1* | 2/2021 | Mezzacapo | .............. G06N 5/04 |
| 2023/0040584 A1* | 2/2023 | Baker | ..................... G06F 17/16 |

* cited by examiner

*Primary Examiner* — Bryce M Aisaka
(74) *Attorney, Agent, or Firm* — Fenwick & West LLP

(57) ABSTRACT

Logic verification of superconducting electronic circuits is implemented as follows. The superconducting electronic circuit is supposed to implement a desired logic function. A description of the circuit includes a plurality of nodes of the circuit, including one or more input nodes and one or more output nodes. Operation of the superconducting electronic circuit is simulated, including probing signal values at the nodes. These signal values are converted to state transitions of the quantum phase at the nodes (phase state transitions). The phase state transitions are related to the logic values represented by the circuit. The phase state transitions are compared with the desired phase state transitions for the desired logic function. Based on this comparison, it is determined whether the superconducting electronic circuit implements the desired logic function.

19 Claims, 15 Drawing Sheets
(5 of 15 Drawing Sheet(s) Filed in Color)

Product Idea 910

EDA Processes 912

Tape Out 934

Fabrication 936

Packaging & Assembly 938

Manufactured Chips 940

System Design 914

Logical Design and Functional Verification 916

Synthesis and Design for Test 918

Netlist Verification 920

Design Planning 922

Physical Implementation 924

Analysis and Extraction 926

Physical Verification 928

Resolution Enhancement 930

Mask Data Preparation 932

LOGIC VERIFICATION OF SUPERCONDUCTING ELECTRONIC CIRCUITS, INCLUDING FOR MARGIN ANALYSIS OF YIELD

CROSS REFERENCE TO RELATED APPLICATIONS

This application claims priority under 35 U.S.C. § 119 (e) to U.S. Provisional Patent Application Ser. No. 63/287,931, "Logic Verification of Superconducting Electronic Circuits, including for Margin Analysis of Yield," filed Dec. 9, 2022. The subject matter of all of the foregoing is incorporated herein by reference in their entirety.

STATEMENT REGARDING FEDERALLY SPONSORED RESEARCH OR DEVELOPMENT

This invention was made with government support under contract W911NF-17-9-0001 awarded by the Office of the Director of National Intelligence, Intelligence Advanced Research Projects Activity (IARPA), via the U.S. Army Research Office. The government has certain rights in the invention.

TECHNICAL FIELD

The present disclosure generally relates to an electronic design automation (EDA) system. In particular, the present disclosure relates to logic verification of superconducting electronic circuits.

BACKGROUND

It is desirable to verify that a circuit design implements its intended logic function before fabricating the circuit design. In digital complementary metal oxide semiconductor (CMOS) circuits, logic states of 1 and 0 are represented as high and low voltage levels. Circuit simulation can be used to predict the output voltage waveforms of digital CMOS circuits. The voltage waveforms can be converted to logic states by selecting a threshold. Voltages above the threshold are classified as the logic state of 1, and voltages below the threshold are classified as the logic state of 0. Based on these definitions, the analysis of signals can be dumped in what is known as a Value Change Dump (VCD). Based on switching events between 0 and 1 described in the VCD file, the event time for the switching event can be captured, and the logic of the gate can be deduced and compared to a desired truth table for the intended logic function.

For superconducting electronic (SCE) circuits, however, these kinds of high/low voltage levels which constitute I/O logic states do not exist and the VCD approach used to verify CMOS digital circuits does not apply to verify SCE circuits.

SUMMARY

In some aspects, logic verification of superconducting electronic circuits is implemented as follows. The circuit is intended to implement a desired logic function. A description of the circuit includes a plurality of nodes of the circuit, including one or more input nodes and one or more output nodes. Operation of the superconducting electronic circuit is simulated, including probing signal values at the nodes. These signal values are converted to state transitions of the quantum phase at the nodes (phase state transitions). The phase state transitions are related to the logic values represented by the circuit. The phase state transitions are compared with the desired phase state transitions for the desired logic function. Based on this comparison, it is determined whether the superconducting electronic circuit implements the desired logic function.

In one class of applications, the logic verification is used to predict yields for the superconducting electronic circuit. Other aspects include components, devices, systems, improvements, methods, processes, applications, computer readable mediums, and other technologies related to any of the above.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 2C shows a method to exercise all possible logic state transitions according to some embodiments of the present disclosure.

DETAILED DESCRIPTION

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

Aspects of the present disclosure relate to logic verification of superconducting electronic (SCE) circuits. The approach described herein is based on converting simulation results (e.g., node voltages or other signal values) to phase state transitions, and then verifying the logic function by comparing the phase state transitions from the simulation to the desired phase state transitions for the desired logic function. Depending on whether the phase state transitions from the simulation match the desired phase state transitions, the present system verifies whether the SCE circuit implements the desired logic function.

This logic verification approach may be used for many purposes, including yield analysis and margin analysis for circuit designs. In yield analysis, logic verification may be performed for the same SCE circuit but under different operating conditions, for example different process variations, different bias voltages, different operating temperatures, and/or different thermal noise variations. Monte Carlo simulations may be run to determine what fraction of SCE circuits pass or fail logic verification under the different conditions. This information can then be used for various yield-related purposes, some examples of which are described herein.

The use of phase state transitions is advantageous because the physical operation of SCE circuits is based on state transitions of the quantum phase, rather than storing states as in CMOS. Depending on the type of SCE circuit, the quantum phase state may increment, decrement or remain unchanged.

Figure 1:
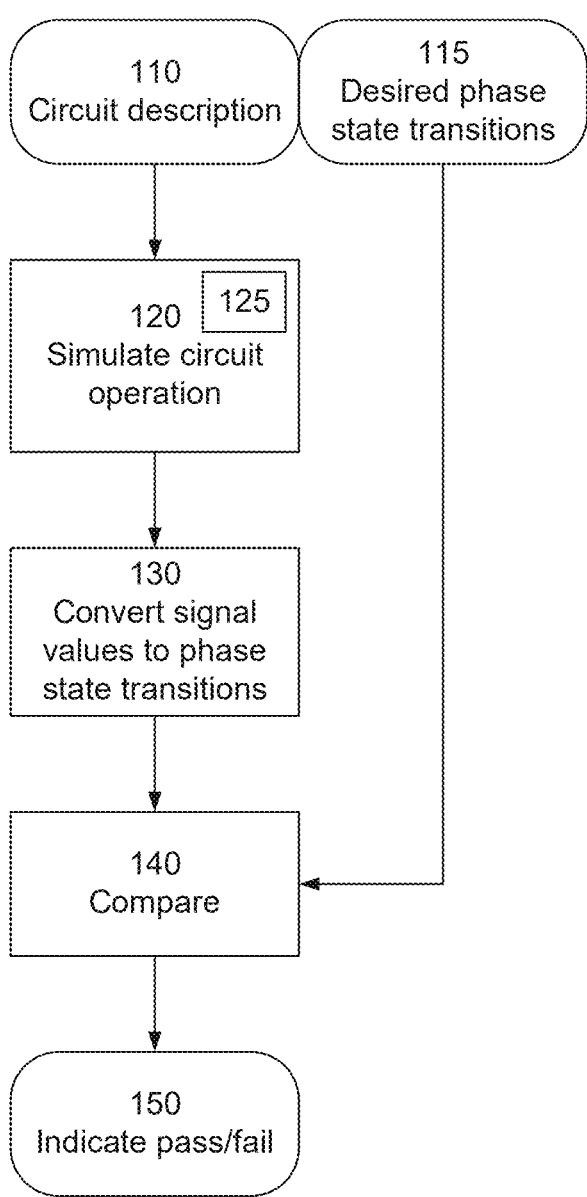
FIG. 1 is a flow diagram for logic verification of superconducting electronic circuits according to some embodiments of the present disclosure.

FIG. 1 is a flow diagram for logic verification of SCE circuits according to some embodiments of the disclosure. In this example, an SCE circuit is intended to implement a desired logic function. For example, the SCE circuit may implement some Boolean logic or may implement some sort of flip-flop, latch, register or other memory element. The design of the SCE circuit 110 represents the circuit as a set of connected nodes, including input node(s) and output node(s). The process of FIG. 1 determines whether the SCE circuit actually implements the desired logic function.

At 120, the operation of the SCE circuit is simulated. The simulation may be based on modeling the physics of the SCE circuit and then using this model to time step through operation of the circuit. As part of the simulation 120, values of signals at various nodes in the circuit are probed. Thus, the simulation records waveforms for the signal values at different nodes, as indicated by the box 125. For example, the signal values at the input and output nodes may be recorded.

At 130, these signal values are converted to transitions in the state of the quantum phase of the circuit, referred to as phase state transitions. In a digital circuit, logic signals have two possible logic values: 0 or 1. In SCE circuits, these logic values are represented by phase state transitions, rather than voltage level as is the case in CMOS digital circuits. Phase state transitions are transitions (or lack of transitions) in the quantum phase of the circuit. For example, phase state transition=TRUE may represent a change in the quantum phase state between two clock cycles and may be used to represent a logic 1. Phase state transition=FALSE may represent no change in the quantum phase state between the two clock cycles and may be used to represent a logic 0.

The desired functionality of the SCE circuit is described with respect to these phase state transitions as indicated by 115. At 140, the phase state transitions determined from the simulation are compared to the desired phase state transitions 115, and this is used to verify whether the SCE circuit implements the desired logic function. Consider a two-input gate with A and B as the inputs and X as the output. The simulation of the SCE circuit produces phase state transitions for A, B and X over a number of clock cycles. These may be compared to the desired behavior of the circuit. For the given phase state transitions in A and B, does the simulation produce the phase state transitions in X that match the desired phase state transitions 115. The desired phase state transitions 115 for X may be determined through the evaluation of Boolean logic expressions (i.e., the desired logic function) upon the phase state transitions of the inputs A and B, from a table look up or from a co-simulation of a logic description of the circuit, for example. At 150, a corresponding indication may be produced based on the result of the comparison 140.

Figure 2A:
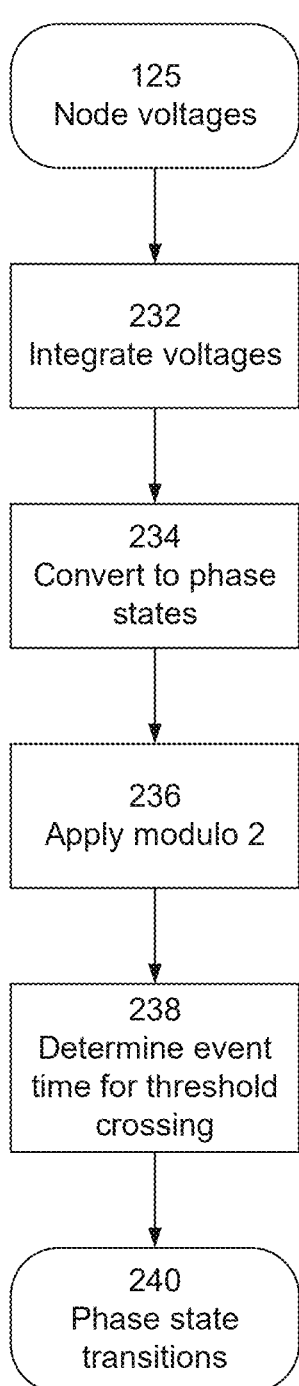
FIG. 2A is a flow diagram for converting signal values to phase state transitions according to some embodiments of the present disclosure.
Figure 2B:
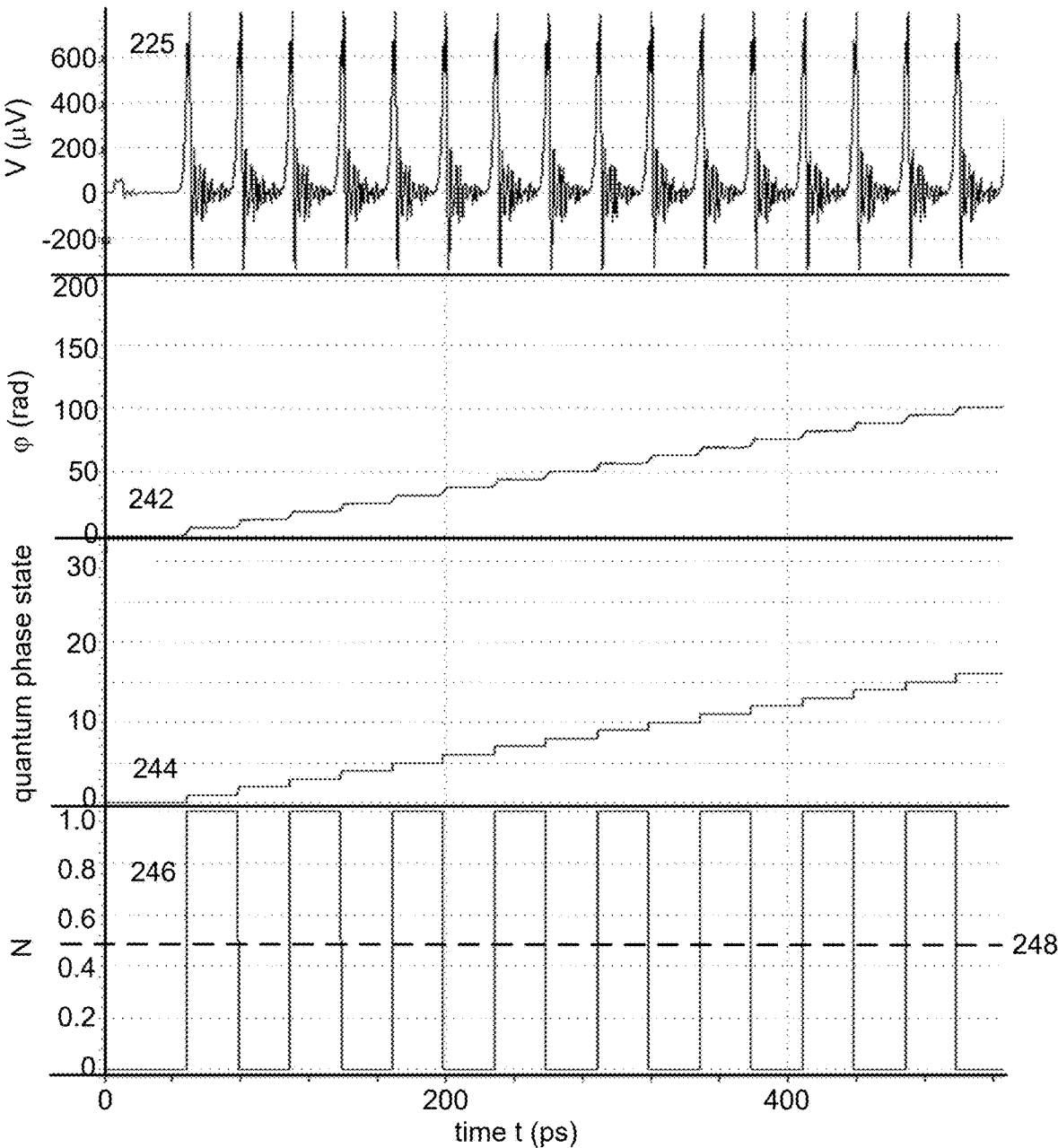
FIG. 2B are time plots illustrating the flow of FIG. 2A.

FIGS. 2A and 2B illustrate an example for converting signal values to phase state transitions, shown as step 130 in FIG. 1. This flow may be used for single flux quantum (SFQ) logic families. SFQ logic uses a single quantum of magnetic flux $\Phi_0=h/(2e)$ to represent binary information, where h is Plank's constant and e is the electron charge. SFQ logic may be implemented using Josephson junctions. A Josephson junction is created when two superconducting materials are brought together, separated by a thin insulator resulting in a "super current" which flows across the junction due to a difference in quantum phase ($\varphi$) between the wave-functions of the two superconducting materials. The Stewart-McCumber resistively and capacitively shunted junction (RCSJ) model follows a sine relationship between the current I flowing through the junction and the quantum phase $\varphi$:

$$I(t) = I_c \sin(\varphi) + \frac{\Phi_0}{2\pi R}\frac{d\varphi}{dt} + C\frac{\Phi_0}{2\pi}\frac{d^2\varphi}{dt^2} \qquad (1)$$

where $I_c$ is the critical current for the junction, R is the resistive shunt from the model, and C is the capacitive shunt from the model. The single flux quantum $\Phi_0$ appears as a voltage pulse. Voltage V and quantum phase q are related as follows:

$$V(t) = \frac{\Phi_0}{2\pi}\frac{d\varphi}{dt} \qquad (2A)$$

$$\varphi(t) = \int \frac{2e}{\hbar}V(t)dt \qquad (2B)$$

where Plank's reduced constant $\hbar=h/2\pi$.

Figure 3:
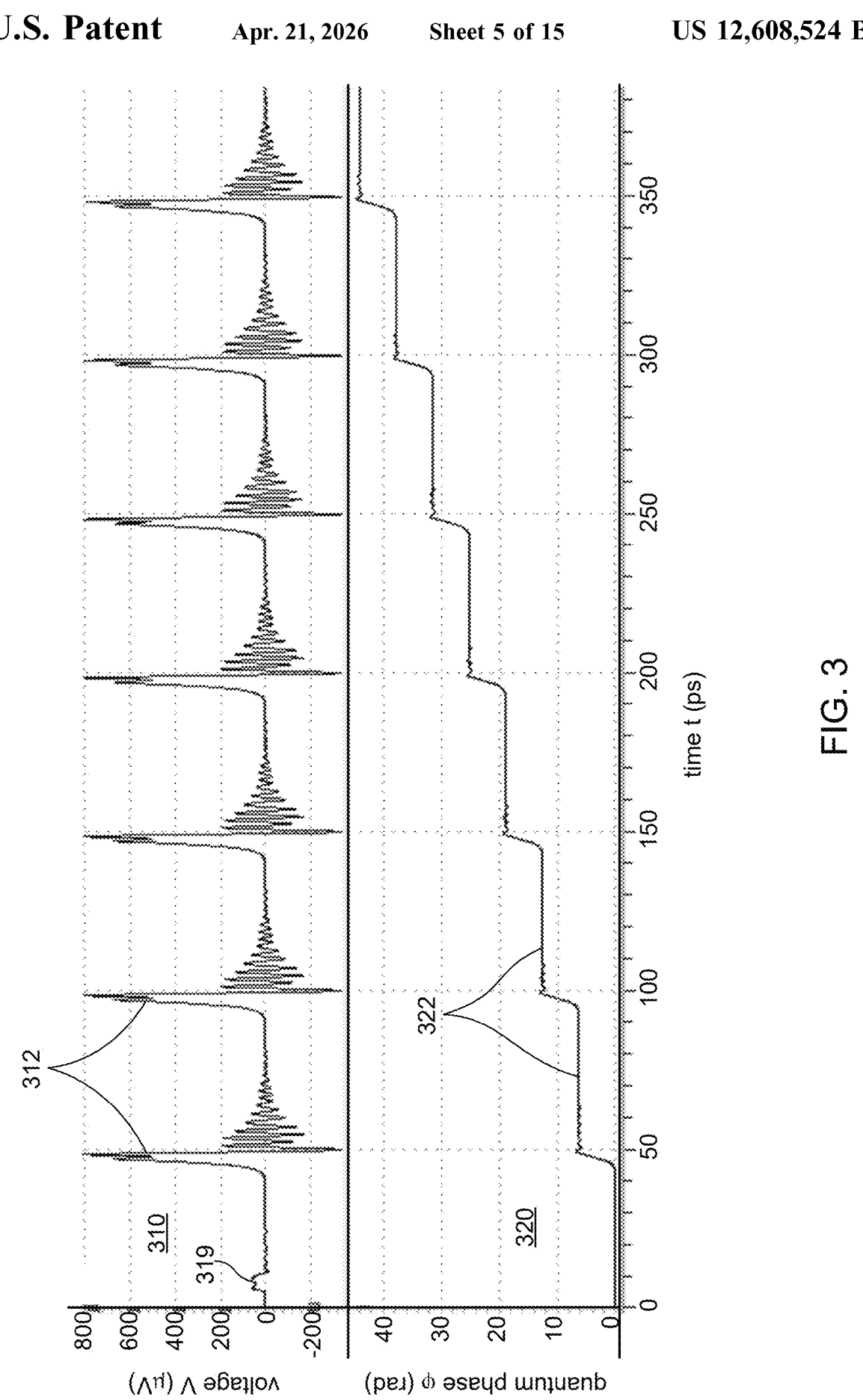
FIG. 3 are time plots showing the relationship between voltage and quantum phase according to some embodiments of the present disclosure.

FIG. 3 are time plots of voltage and quantum phase illustrating the relations of Eqns. 2A and 2B. The top time plot 310 in FIG. 3 is a plot of voltage V as a function of time t. The voltage pulses 312 correspond to occurrences of the single flux quantum $\Phi_0$. The bottom time plot 320 in FIG. 3 is a plot of the corresponding quantum phase $\varphi$ as given by Eqn. 2B. Each voltage pulse results in a 21 increase in the quantum phase. In FIG. 3, the plateaus 322 at multiples of $2\pi$ may be considered to be quantum phase states, and the activity between the quantum phase states are phase state transitions coinciding with the voltage pulses. Note that the voltage waveform 310 has a small blip 319 before the voltage pulses. Integration of this blip yields an offset in the quantum phase, which may be removed to ensure that the quantum phase states fall at integer multiples of $2\pi$.

For SCE logic, the same principles used in CMOS logic do not apply. The signal is the emittance of the single flux quantum pulses. A logic 1 is represented by the presence of the pulse and a logic 0 is inferred by the absence of the pulse, with no definitive moment when precisely the logic value transitions from a 1 to a 0. In practice, the logic state of the circuit (1 or 0) is determined by analyzing the history of quantum phase transitions and their directions.

Figures 4A, 4B:
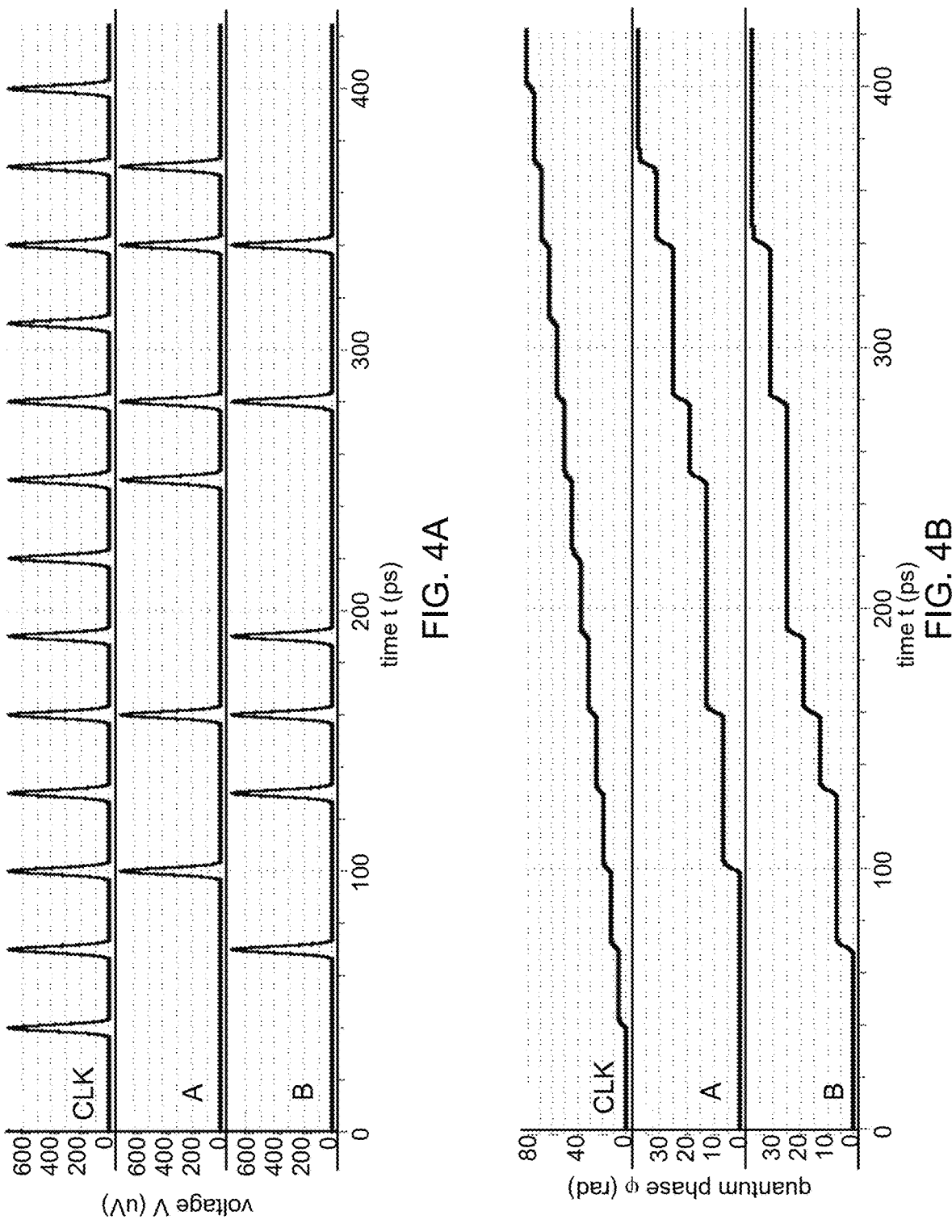
FIGS. 4A and 4B are time plots of voltage and corresponding quantum phase, respectively, for logic signals according to some embodiments of the present disclosure.

FIGS. 4A and 4B show an example with a clock signal CLK and two logic signals A and B. FIG. 4A shows the voltage V for each of these signals. In FIG. 4A, the pulses are simplified for purposes of clarity. Each pulse in FIG. 4A is the emittance of a single flux quantum. The pulses for the CLK signal establish the timing of the circuit. The presence of pulses for signals A and B indicates a logic-1 and the absence of pulses indicates a logic-0. FIG. 4B shows the corresponding quantum phases, where each voltage pulse results in a $2\pi$ increase in the quantum phase, which is a transition of the quantum phase state. The increases are not instantaneous, and the slope of the $2\pi$ phase transitions is analogous to slew rates in CMOS logic circuits. The presence or absence of pulses and corresponding phase state transitions for signals A and B is determined according to the clocking set by the CLK signal. Effects such as minimum setup time and differences in propagation delay for the different signals may also be accounted for in making these determinations.

Returning now to FIGS. 2A and 2B, FIG. 2A is a flow diagram for converting signal values (node voltages in this example) to phase state transitions, and FIG. 2B are corresponding time plots illustrating this flow. The nodes voltages 125 are probed by the simulation of the SCE circuit. Plot 225 in FIG. 2B shows an example voltage waveform. The voltage pulses are apparent. At 232 of FIG. 2A, the node voltages V(t) are integrated and scaled, implementing Eqn. 2B. This yields the quantum phase $\varphi(t)$ with quantum phase states at increments of 2 phase, as shown by the waveform 242 in FIG. 2B. In steps 234-238 of FIG. 2A, the quantum phase is converted to phase state transitions by detecting changes in the quantum phase states. At 234, the quantum phase is converted to quantum phase states which are integer multiples of $2\pi$ radians. That is, quantum phase state=round ($\varphi/2\pi$). This is waveform 244 in FIG. 2B. Any phase offset may also be removed.

The quantum phase transitions are determined by determining when the quantum phase state 244 crosses N+0.5, where N is an integer. At 236 of FIG. 2A, modulo 2 is applied to waveform 244, resulting in waveform 246 of FIG. 2B. At 238 of FIG. 2A, the event times for the quantum phase transitions are determined as the times when waveform 246 crosses a threshold (e.g., 0.5). The threshold of 0.5 is shown by the dashed line 248 in FIG. 2B. The output of the flow shown in FIG. 2A is a listing of event times for the phase state transitions at 240.

Because the events times for the phase state transitions are not required to occur at a multiple of a clock period, the output of the flow in FIG. 2A is based on continuous time measurements of the node voltages and subsequent quantities, rather than just sampling these values at discrete times defined by a clock. These continuous time measurements may be converted to discrete time samples by applying a clock. The continuous time measurements may be used to determine the time locations of clock pulses. The times of the clock pulses may then be used to sample the continuous time measurements of other quantities, such as the phase state transitions of logic signals. For example, referring to FIG. 4, the event times for CLK determine the clocking of the circuit. The event times for signals such as A and B are compared to the event times for CLK to determine whether there is a phase state transition for each clock period.

In FIGS. 2A and 2B, switching events (switching quantum phase state) are detected based on $2\pi$ radian changes in the quantum phase. The switching events are characterized by a transition from $2\pi N$ to $2\pi(N+1)$ radians in quantum phase where N is an integer, and the time of the switching event is defined as when the quantum phase equals $2\pi(N+0.5)$ radians. Phase state transitions may then be set as either TRUE or FALSE, depending on whether a switching event has occurred. The determination of phase state transitions may be determined by using a sliding time window for the circuit simulation, rather than considering the entire simulation at once.

Figure 2C:
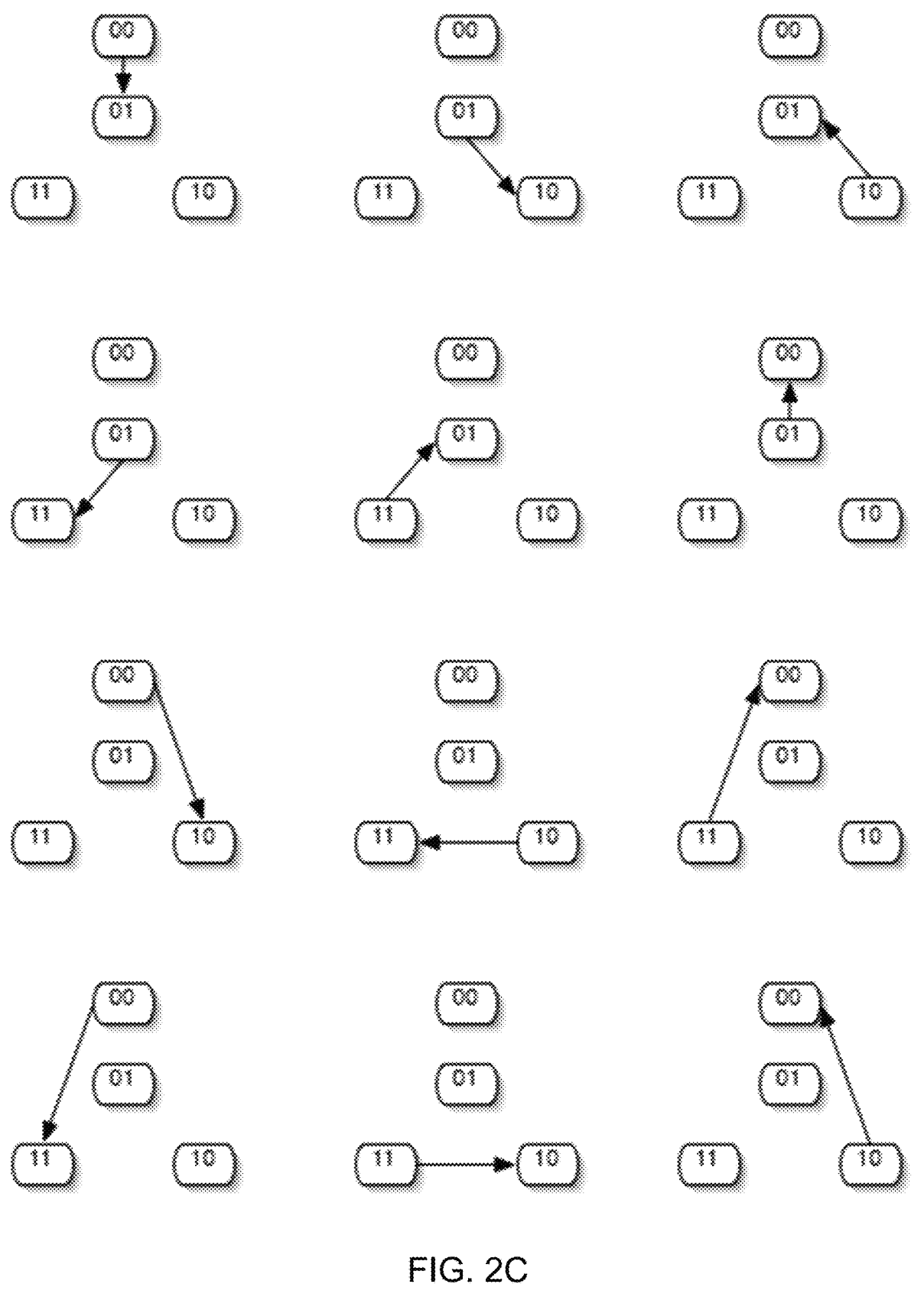

FIG. 2C shows a method to exercise all possible logic transitions for a two-input gate. In this example, 0 and 1 represent the logic values of the two input logic signals, for example A and B of FIG. 4. There are then 12 possible transitions between logic states. In general, if there are N possible logic states, there will be N(N−1) possible logic state transitions. FIG. 2C shows a chain of 12 transitions which exercise every one of the 12 possible logic state transitions. The progression is from left to right across each row, and then from top to bottom row. The chain in this example is $00\rightarrow01\rightarrow10\rightarrow01\rightarrow11\rightarrow01\rightarrow00\rightarrow10\rightarrow11\rightarrow00\rightarrow11\rightarrow10\rightarrow00$. These types of chains may be used to define test stimuli to cover all possible logic state transitions in a low number of test cycles.

SCE circuits may exhibit hysteresis, so the logic output may depend on the prior state(s) in addition to the current state. These effects may be accounted for by exercising different logic state transitions, in addition to exercising different logic states. For circuits with a low number of logic states, all of the possible logic state transitions may be expressly tested. However, the number of possible logic state transitions grows quickly with the number of logic states. The number of possible logic state transitions also grows quickly as more past states are considered. FIG. 2C shows a situation with two logic signals and four possible logic states, and a logic state transition that is based on only the immediately prior state. The number of possible logic state transitions quickly becomes infeasible to test expressly as the number of logic signals increases beyond two, and as the logic state transitions are extended in time to include more past states.

In such cases, rather than using a predefined chain sequence such as shown in FIG. 2C, an approach based on randomized bit patterns may be used. Random logical bit patterns are generated as a long sequence of test stimuli. The logic verification is run for a large number of sequential cycles in order to stochastically test different logic state transitions. The cycles are sequential, meaning that one cycle is run after another, starting from the state of the previous cycle. The sequence of cycles is long enough to account for hysteresis and other effects that depend on past states or that may build up in the circuit over time. As the logic verification is run continuously for more cycles, the confidence in the predicted result increases. The logic verification may be run for a sufficient number of cycles to achieve a certain low bit-error-rate.

The approaches for logic verification of SCE circuits described herein may be used for many purposes beyond just logic verification. One example application is yield analysis.

Figure 5:
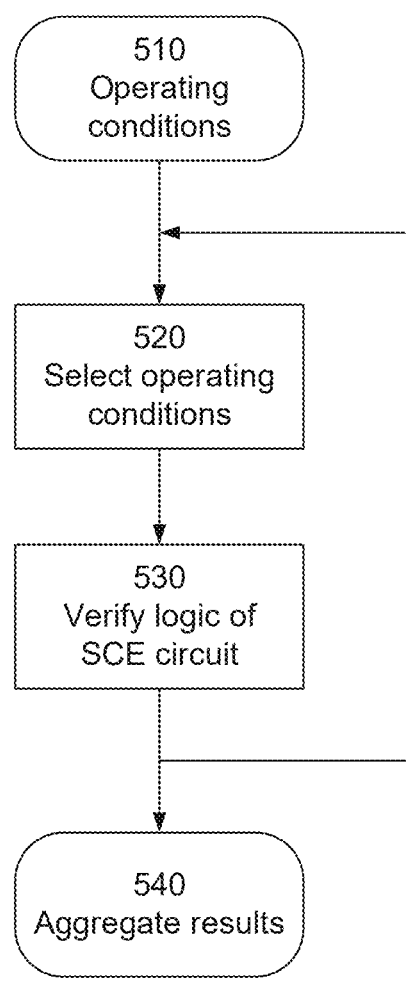
FIG. 5 is a flow diagram for yield analysis of superconducting electronic circuits according to some embodiments of the present disclosure.

FIG. 5 is a flow diagram for yield analysis of SCE circuits. The yield is analyzed for certain operating conditions. This may be for a specific operating condition or over a range of operating conditions 510. Examples of different operating conditions include different process variations, different bias currents or voltages, different operating temperatures, and different thermal noise variations. Monte Carlo simulation is performed, as represented by the loop in FIG. 5. For each iteration, at 520, a specific operating condition is randomly selected. At 530, the operation of the SCE circuit at that operating condition is simulated and its logic is verified, for example using the techniques described herein. The SCE circuit either passes or fails the logic verification. At 540, the pass/fail results are aggregated over all simulations. The yield may be estimated as (#passes)/(#passes+#fails).

Additional analysis may also be performed. For example, the yield may be estimated as a function of various parameters: bias current, bias voltage, operating temperature, clock frequency, and data periodicity, for example. This may be achieved by running the Monte Carlo simulations while varying the parameter of interest as the independent variable in the simulations. For example, simulations may be run for different values of the bias current. Alternatively, the simulation results may be regressed against the parameter of interest.

Statistical analysis may include estimating confidence or confidence intervals. This quantifies how reliable a particular estimate is expected to be. For example, the expected yield may be expressed as 90% confidence that the yield will be at least X %, 95% confidence that the yield will be at least Y %, and 99% confidence that the yield will be at least Z %. Plots and statistical distributions may provide an even more complete picture.

Margins may also be estimated. Margin is the range of some parameter over which performance is expected to be acceptable. For example, the bias voltage may have a margin of +/−X volts in order to achieve Y % yield.

Figure 6A:
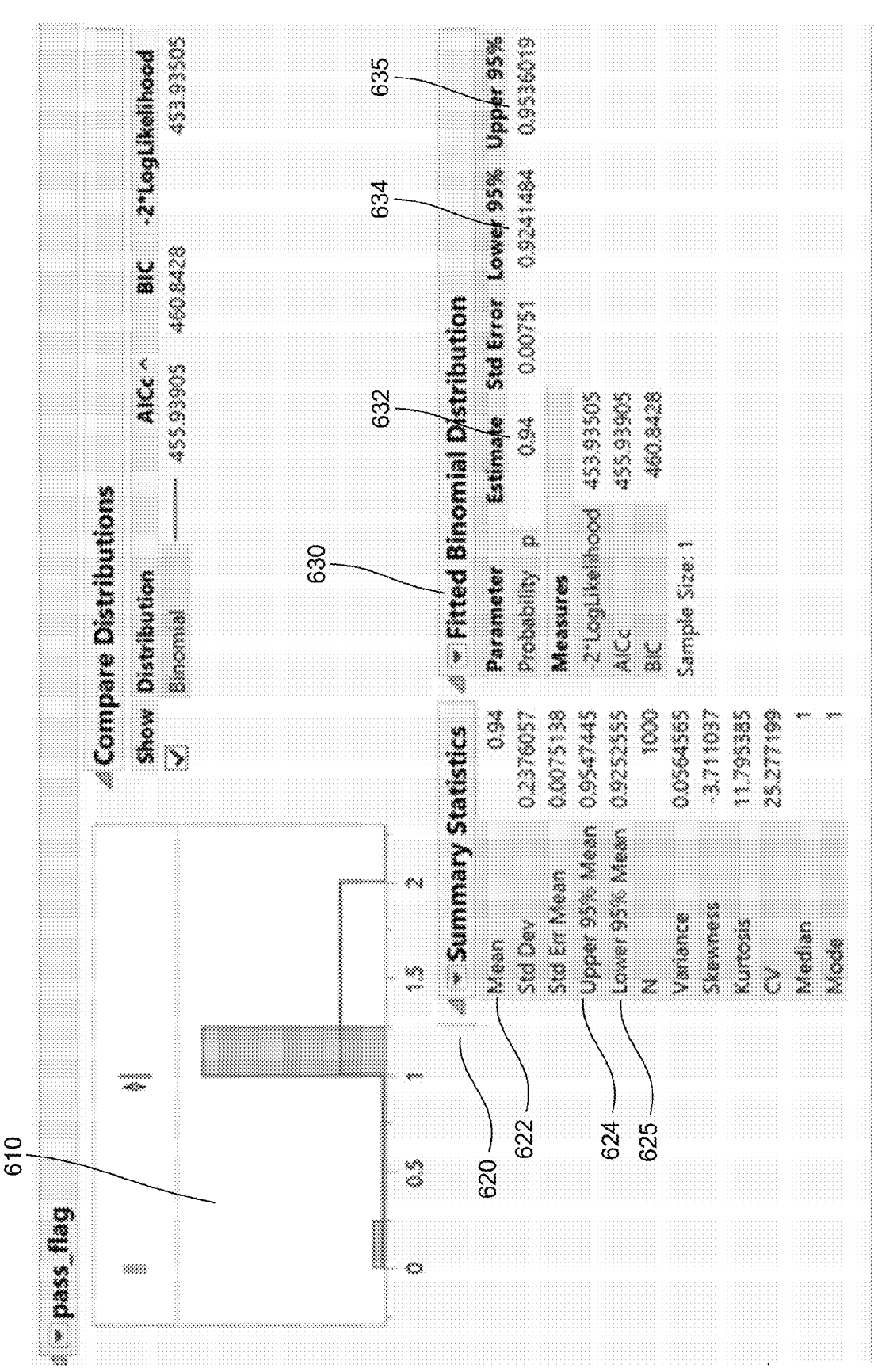
FIGS. 6A-6C are screen shots showing statistical analysis of yield based on Monte Carlo simulations according to some embodiments of the present disclosure.

FIG. 6A is a screen shot showing Gaussian and binomial distribution fits to a Monte Carlo trial with 1000 simulations (N=1000 in the Summary Statistics section). Of the 1000 simulations, approximately 940 passed and 60 failed, as shown by the histogram 610 where 1=pass and 0=fail. The Summary Statistics section 620 provides some statistics based on a fit to a Gaussian distribution. The expected value 622 for the yield is 94%. The 95% confidence interval is bounded by the lower and upper values 624, 625 of 92.5% and 95.5%. The Fitted Binomial Distribution section 630 provides some statistics based on a fit to a binomial distribution. Here, the mean yield 632 is 94%. The 95% confidence interval is bounded by the lower and upper values 634, 635 of 92.4% and 95.4%.

Figures 6B, 6C:
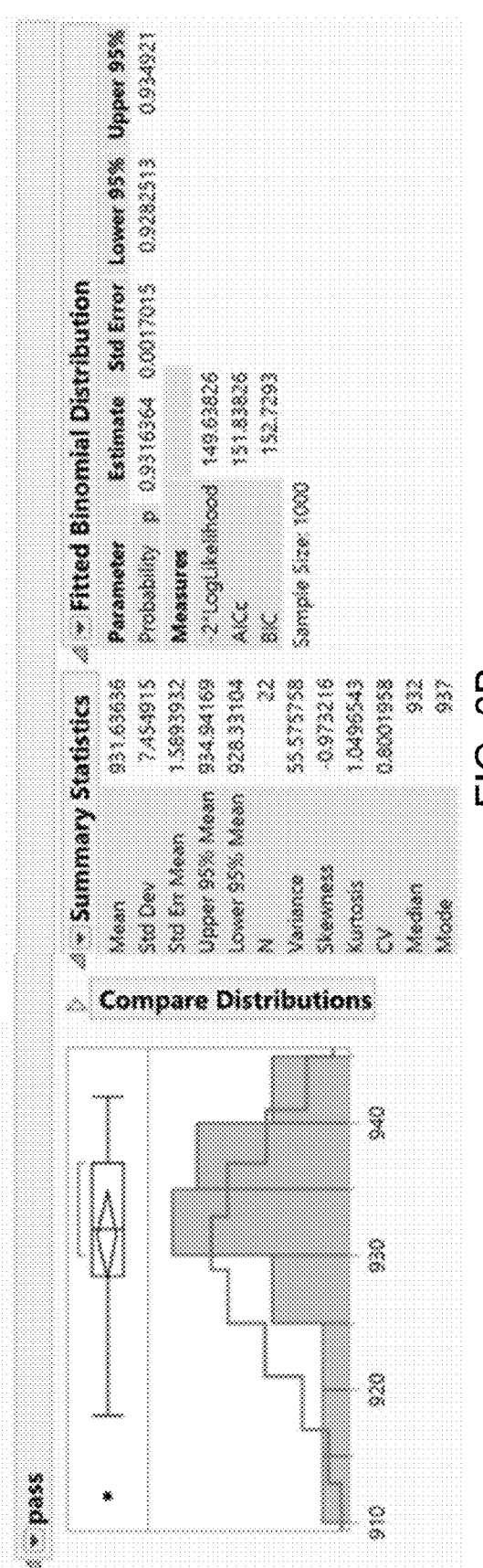

FIGS. 6B and 6C show similar screen shots but with more trials. FIG. 6B shows statistical analysis for 21 additional trials, and FIG. 6C shows results for an additional 39 trials beyond FIG. 6B.

Figure 7A:
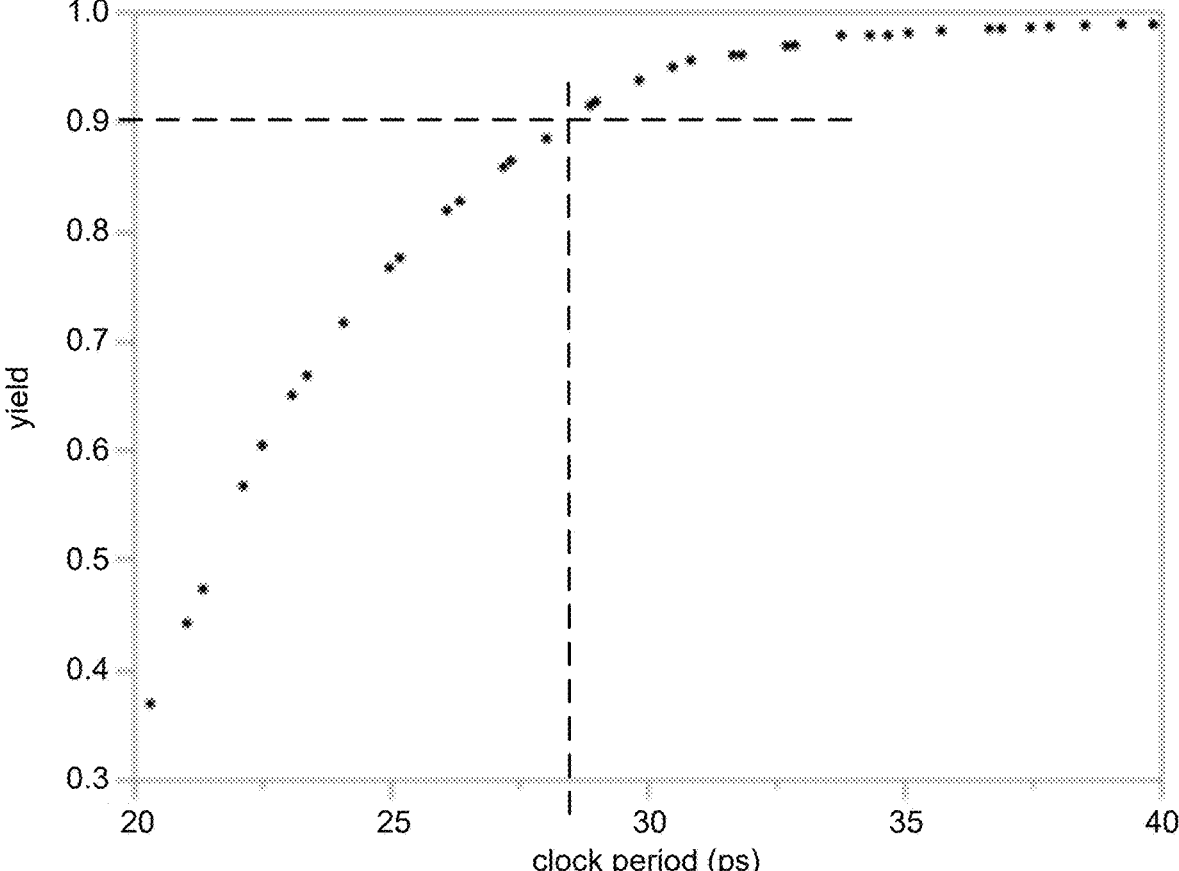
FIG. 7A shows a plot of yield as a function of clock period according to some embodiments of the present disclosure.

FIG. 7A shows a plot of yield as a function of clock period. Each dot represents the estimated yield based on 1000 samples of Monte Carlo simulation. The dashed lines show that 90% yield (yield=0.9) corresponds to a clock period of approximately 28.5 ps. The nominal clock period=30 ps. Thus, there is some margin to increase the clock speed while maintaining a yield of 90%. Alternatively, the yield may be increased by reducing the clock speed (increasing the clock period).

Figure 7B:
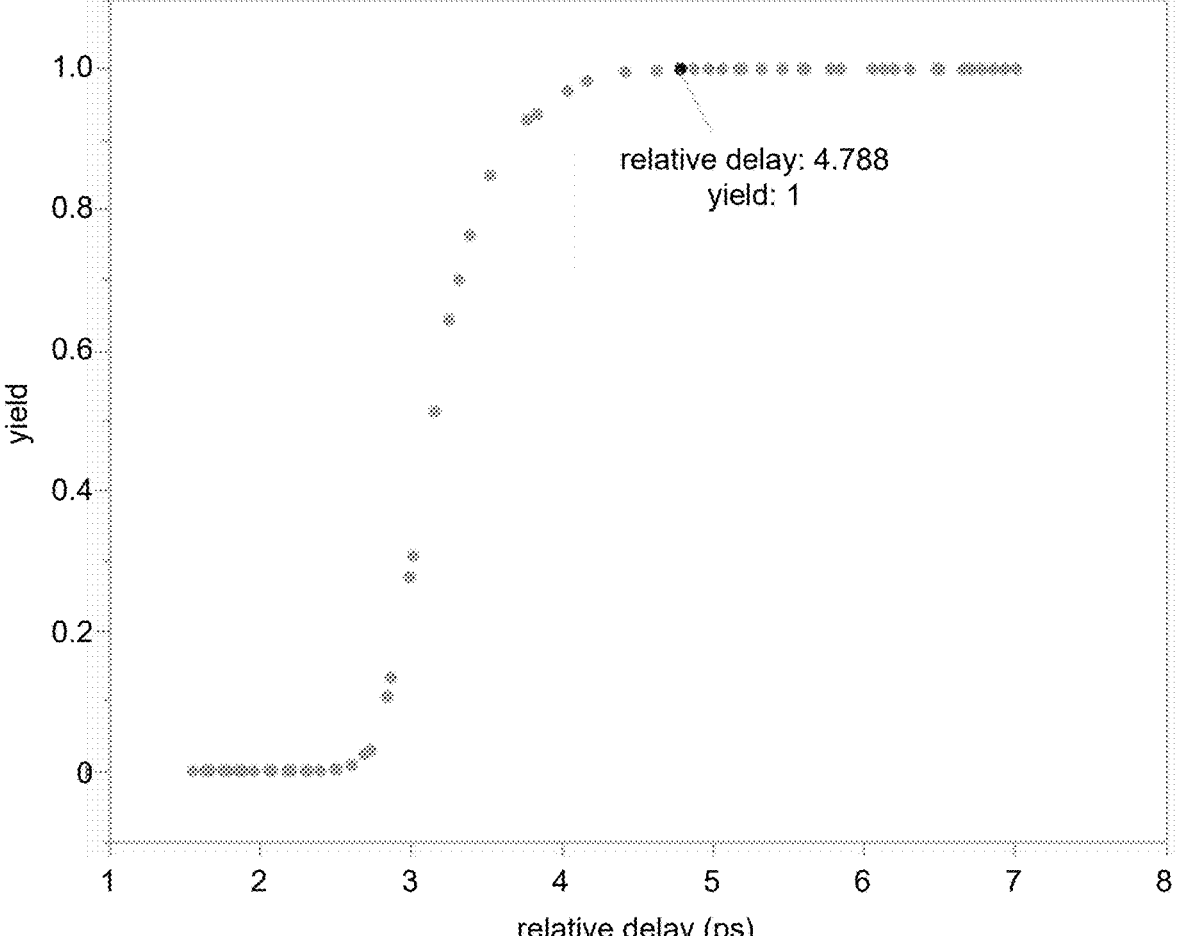
FIG. 7B shows a plot of yield as a function of the temporal separation between two signals according to some embodiments of the present disclosure.

FIG. 7B shows another example, which is a plot of yield as a function of the temporal separation between two signals. As the spacing between the two signals decreases, at some point the circuit enters a race condition, which is a failed circuit. In FIG. 7B, the circuit reaches 100% yield when the two signals are separated by 4.788 ps or more.

Figure 8A:
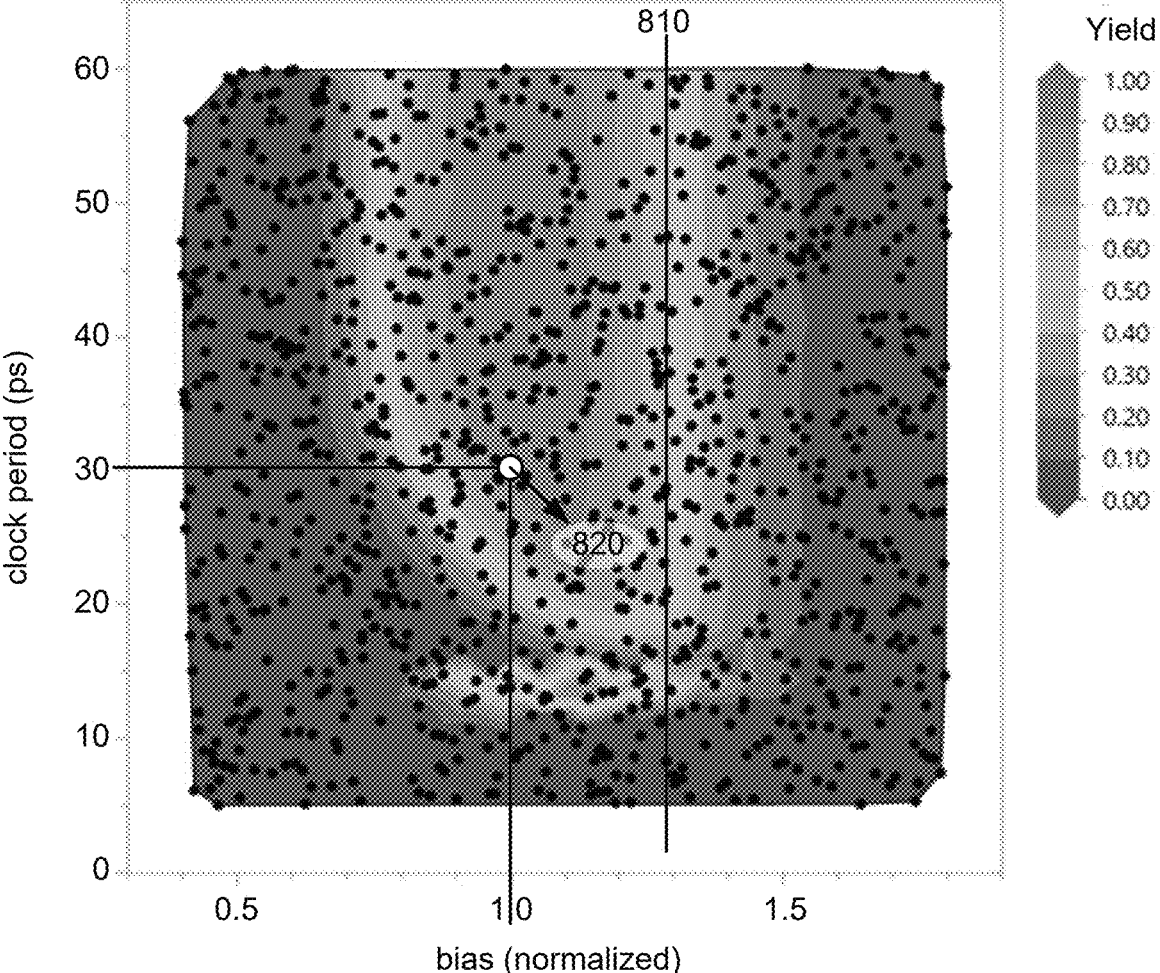
FIG. 8A shows a plot of yield as a function of clock period and normalized bias according to some embodiments of the present disclosure.
Figure 8B:
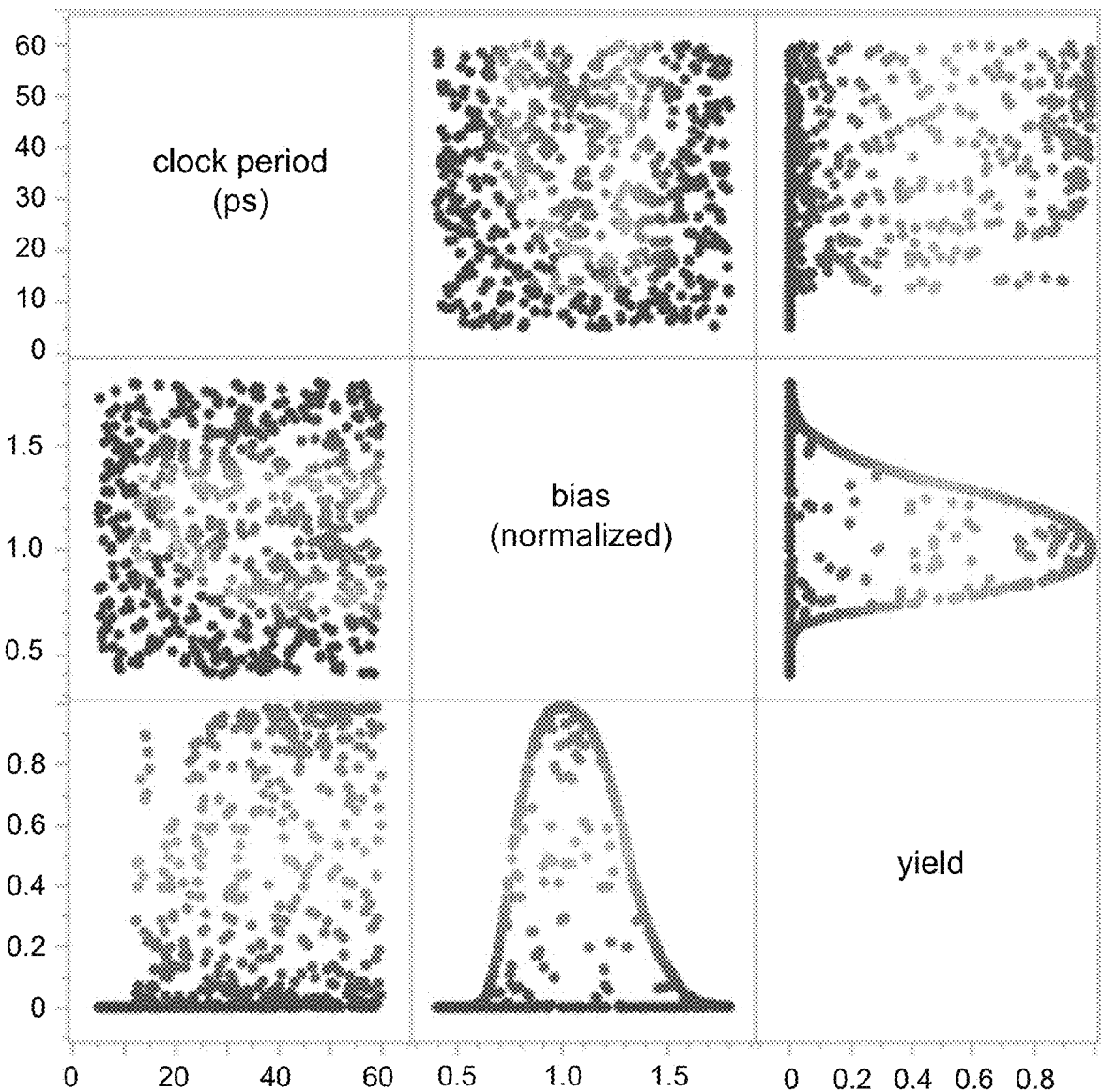
FIG. 8B shows scatterplots of the data from FIG. 8A.

FIG. 8A shows a plot of yield as a function two variables: clock period and normalized bias. The nominal values are bias=1 and clock period=30 ps, as marked by the center white circle and solid lines extending to the center white circle. The black dots represent the distribution of simulations that were run. The color indicates yield, where green=100% yield and red=0% yield. In this example, there is a well-defined failure frontier 810 as the bias increases. Also, it is possible to increase the clock frequency (decrease clock period) without adversely affecting the yield if the bias is also increased, as indicated by arrow 820. Comparing FIGS. 8 and 7, if the acceptable yield is 90%, then the clock frequency can be increased significantly more than in FIG. 7 by also increasing the bias. FIG. 8B shows the same data as in FIG. 8A, but as a scatterplot taking two variables at a time. This is one way to visualize higher dimension data.

The techniques described above may be used for other types of SCE circuits. For example, the use of a large number of sequentially applied bit patterns may also be applied to the adiabatic quantum-flux-parametron (AQFP) family of circuits to perform logic verification and yield analysis. AQFP circuits do not rely on single quantum of magnetic flux. Rather, the logic 1 and 0 are well-defined. A logic 1 may be represented as a positive steady state current, and a logic 0 may be represented as a negative steady state current. So the conversion of quantum states to logic states may be different (and more straightforward) compared to SFQ circuits, but the approach using sequentially applied bit patterns and analysis for logic verification is still applicable.

Figure 9:
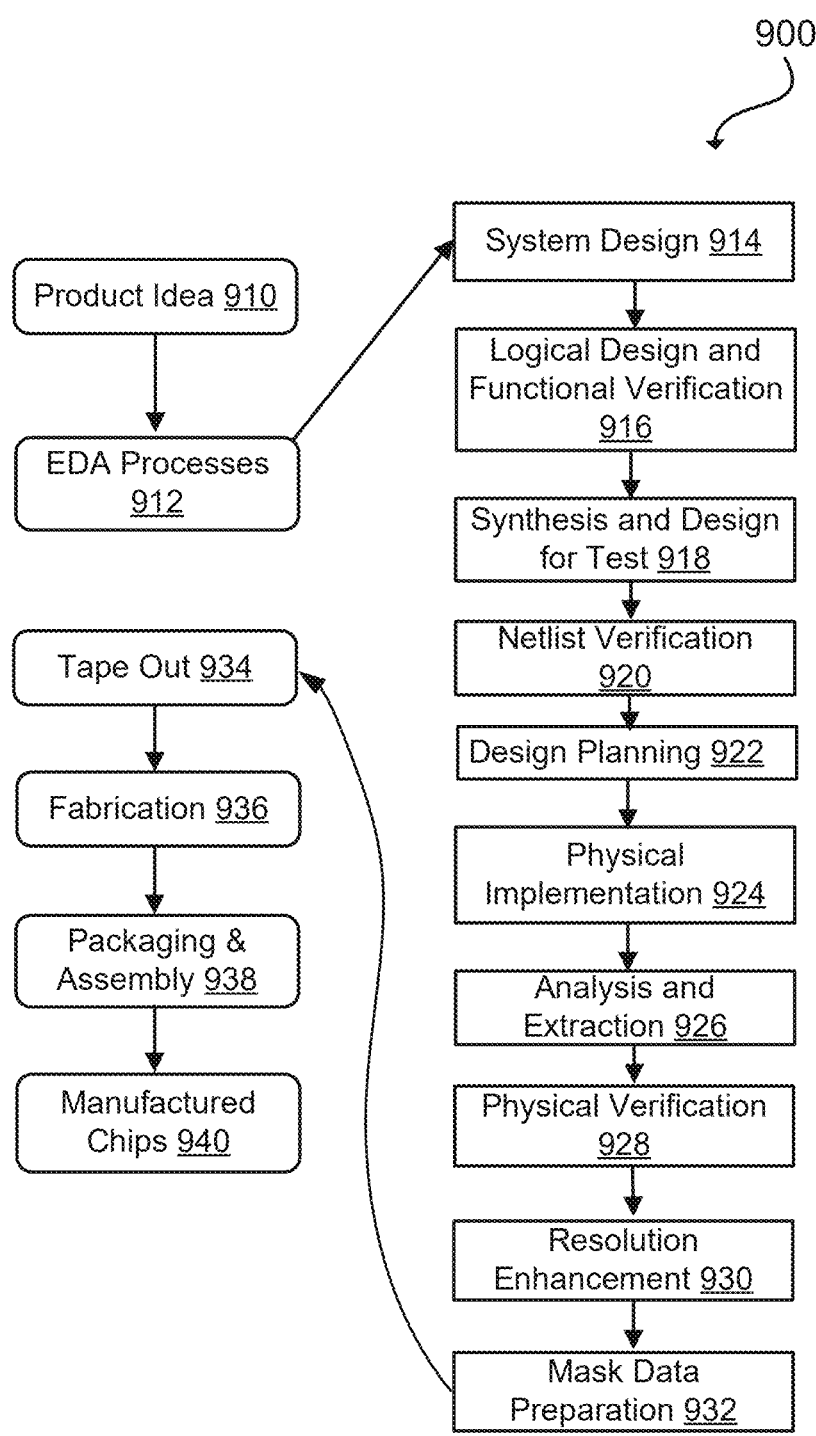
FIG. 9 depicts a flowchart of various processes used during the design and manufacture of an integrated circuit in accordance with some embodiments of the present disclosure.

FIG. 9 depicts a flowchart of various processes used during the design and manufacture of an integrated circuit in accordance with some embodiments of the present disclosure. FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor or superconductor die is fabricated 936 and packaging and assembly processes 938 are performed to produce the finished integrated circuit 940.

Specifications for a circuit or electronic structure may range from low-level transistor or Josephson junction material layouts to high-level description languages. A high-level of representation may be used to design circuits and systems, using a hardware description language ('HDL') such as VHDL, Verilog, System Verilog, SystemC, MyHDL or Open Vera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding tools of that layer (e.g., a formal verification tool). A design process may use a sequence depicted in FIG. 9. The processes described by be enabled by EDA products (or tools).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor or superconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors, Josephson junctions, passive transmission lines, inductors, resistors, or capacitors) and routing (connection of the circuit components by multiple conductors, Josephson Transmission Lines or Passive Transmission Lines) occurs, and the selection of cells from a library to enable specific logic functions can be performed. As used herein, the term 'cell' may specify a set of transistors, Josephson junctions, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

Figure 10:
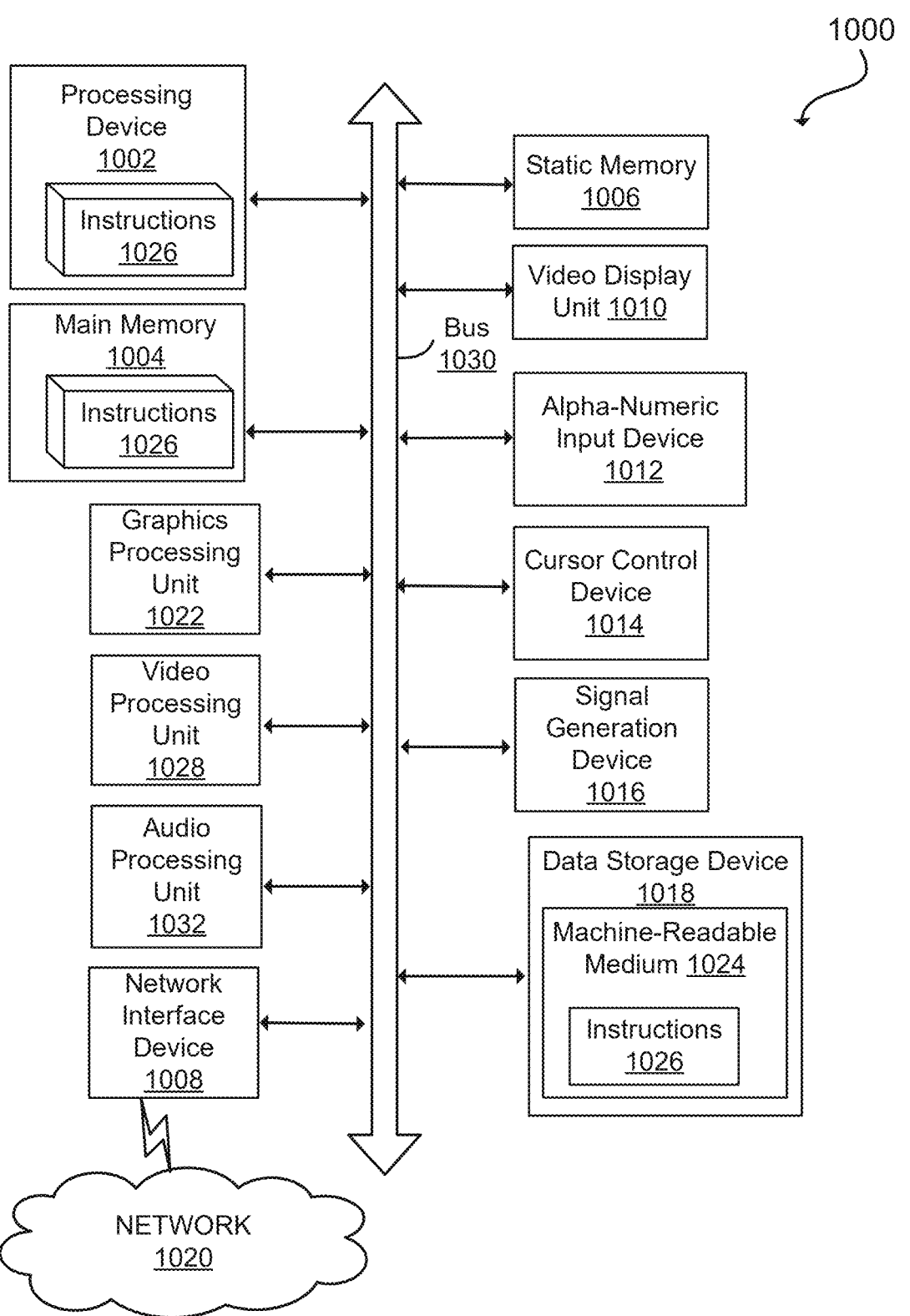
FIG. 10 depicts a diagram of an example computer system in which embodiments of the present disclosure may operate.

FIG. 10 depicts a diagram of an example computer system in which embodiments of the present disclosure may operate. FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

accessing a description of a superconducting electronic circuit for implementing a desired logic function, the description comprising a plurality of nodes including one or more input nodes and one or more output nodes;

simulating operation of the superconducting electronic circuit, comprising probing signal values of at least one of the plurality of nodes;

converting, by a processing device, the signal values to phase state transitions, wherein the phase state transitions are transitions of states of quantum phase at the nodes;

comparing the determined phase state transitions with desired phase state transitions for the desired logic function; and determining an indication whether the superconducting electronic circuit implements the desired logic function based on the comparison.

2. The method of claim 1 wherein:

the signal values of the nodes comprise node voltages of the input nodes and node voltages of the output nodes; and converting the signal values to phase state transitions comprises determining quantum phase signals of the nodes by integrating the node voltages.

3. The method of claim 2 wherein converting the signal values to phase state transitions further comprises: determining the phase state transitions based on $2\pi$ transitions of the quantum phase signals.

4. The method of claim 1 wherein converting the signal values to phase state transitions comprises:

determining quantum phases of the nodes based on the signal values;

determining quantum phase states of the nodes as integer multiples of $2\pi$ radians in the quantum phases of the nodes; and determining the phase state transitions based on transitions of the quantum phase states.

5. The method of claim 4 wherein determining phase state transitions based on the transitions of the quantum phase states comprises:

setting phase state transition=TRUE when there is transition of the quantum phase state, where setting phase state transition=TRUE represents a logic value of 1; and setting phase state transition=FALSE when there is no transition of the quantum phase state, where setting phase state transition=FALSE represents a logic value of 0.

6. The method of claim 1 wherein the signal values of the nodes comprise node voltages of the nodes, and converting the signal values to phase state transitions comprises:

detecting switching events based on occurrence of pulses in the node voltages; and determining the phase state transitions based on the switching events.

7. The method of claim 1 wherein probing signal values of the nodes comprise continuous time measurements of the signal values, and converting the signal values to phase state transitions comprises: determining event times for phase state transitions based on the continuous time measurements of the signal values.

8. The method of claim 7 wherein the superconducting electronic circuit is clocked by a clock signal, and converting the signal values to phase state transitions further comprises:

determining event times for the clock signal; and comparing the event times for the phase state transitions to the event times for the clock signal.

9. The method of claim 8 wherein comparing the event times for the phase state transitions to the event times for the clock signal also accounts for differences in propagation delay between the signal values and the clock signal.

10. The method of claim 1 further comprising: deriving the desired phase state transitions based on a logic description of the superconducting electronic circuit.

11. A method comprising:

for a plurality of different operating conditions of a superconducting electronic circuit for implementing a desired logic function, the superconducting electronic circuit having a plurality of nodes:

simulating operation of the superconducting electronic circuit at the operating condition, including probing signal values of the nodes;

deriving phase state transitions from the signal values; and verifying, based on the phase state transitions, whether the superconducting electronic circuit implements the desired logic function under the operating condition; and estimating a yield of the superconducting electronic circuit based on the logic verifications performed for the plurality of different operating conditions.

12. The method of claim 11 wherein the plurality of different operating conditions comprise at least one of different process variations, different bias currents or voltages, different operating temperatures, and different thermal noise variations.

13. The method of claim 11 wherein estimating the yield of the superconducting electronic circuit comprises estimating the yield as a function of at least one of: bias current, bias voltage, operating temperature, clock frequency, and data periodicity.

14. The method of claim 11 further comprising: estimating a margin for the superconducting electronic circuit based on the estimated yields at different operating conditions.

15. The method of claim 11 wherein simulating operation of the superconducting electronic circuit comprises simulating the operation of the superconducting electronic circuit over a sufficient number of sequential cycles to account for hysteresis effects.

16. The method of claim 11 wherein the superconducting electronic circuit is from a single flux quantum (SFQ) family of circuits that uses a single quantum of magnetic flux to represent binary logic values or from an adiabatic quantum-flux-parametron (AQFP) family of circuits that uses steady state current to represent binary logic values.

17. A non-transitory computer readable medium comprising stored instructions, which when executed by a processing device, cause the processing device to:

in a simulation of a superconducting electronic circuit having a plurality of nodes, probe signal values of the nodes;

derive phase state transitions from the signal values; and verify, based on the phase state transitions, whether the superconducting electronic circuit implements the desired logic function;

wherein the simulation of the superconducting electronic circuit runs over a sufficient number of sequential cycles to account for hysteresis effects in the superconducting electronic circuit.

18. The non-transitory computer readable medium of claim 17 wherein the instructions further cause the processing device to:

perform the verification of the desired logic function for a plurality of different operating conditions; and estimate a yield of the superconducting electronic circuit based on the logic verifications.

19. The non-transitory computer readable medium of claim 17 wherein the simulation of a superconducting electronic circuit uses a Stewart-McCumber resistively and capacitively shunted junction (RCSJ) model for the superconducting electronic circuit.

* * * * *